(12) United States Patent
Reddy et al.

(10) Patent No.: US 11,193,056 B2
(45) Date of Patent: Dec. 7, 2021

(54) COATED PROPPANTS AND METHODS OF MAKING AND USE THEREOF

(71) Applicant: Saudi Arabian Oil Company, Dhahran (SA)

(72) Inventors: B. Raghava Reddy, Pearland, TX (US); Feng Liang, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/178,634

(22) Filed: Feb. 18, 2021

(65) Prior Publication Data

US 2021/0171824 A1   Jun. 10, 2021

Related U.S. Application Data

(62) Division of application No. 16/830,989, filed on Mar. 26, 2020, now Pat. No. 10,954,434.

(Continued)

(51) Int. Cl.
*C09K 8/80* (2006.01)
*C08G 81/02* (2006.01)
*E21B 43/267* (2006.01)

(52) U.S. Cl.
CPC ............ *C09K 8/805* (2013.01); *C08G 81/022* (2013.01); *C08G 81/025* (2013.01); *E21B 43/267* (2013.01)

(58) Field of Classification Search
CPC ...... E21B 43/26; E21B 43/267; E21B 21/003; E21B 33/138; E21B 43/025
See application file for complete search history.

(56) References Cited

U.S. PATENT DOCUMENTS

2003/0224165 A1   12/2003   Anderson et al.
2005/0019574 A1    1/2005   McCrary
(Continued)

FOREIGN PATENT DOCUMENTS

WO    2004092254 A2   10/2004
WO    2004092254 A3    6/2005
(Continued)

OTHER PUBLICATIONS

International Search Report and Written Opinion dated Jul. 1, 2020 pertaining to International Application No. PCT/US2020/024686 filed Mar. 25, 2020.
(Continued)

*Primary Examiner* — Zakiya W Bates
(74) *Attorney, Agent, or Firm* — Dinsmore & Shohl LLP

(57) ABSTRACT

Methods for producing proppants with block copolymer proppant coating include coating proppant particles with the block copolymer proppant coating to produce coated proppants with block copolymer proppant coating. The block copolymer proppant coating is a block copolymer composition having at least one copolymer backbone. Each copolymer backbone comprises at least two hard segments and a soft segment disposed between the at least two hard segments. Additionally, a proppant comprising a proppant particle and a block copolymer proppant coating includes a block copolymer composition having at least one copolymer backbone, in which each copolymer backbone comprises at least two hard segments. A soft segment is disposed between the at least two hard segments. The copolymer backbone has at least one anhydride group grafted onto the soft segment. Furthermore, the anhydride group is crosslinked by an amine-containing crosslinker.

13 Claims, 1 Drawing Sheet

Related U.S. Application Data

(60) Provisional application No. 62/831,886, filed on Apr. 10, 2019.

(56) References Cited

U.S. PATENT DOCUMENTS

| | | |
|---|---|---|
| 2007/0021309 A1 | 1/2007 | Bicerano |
| 2007/0107908 A1 | 5/2007 | Vaidya et al. |
| 2008/0119374 A1 | 5/2008 | Willberg et al. |
| 2009/0238988 A1 | 9/2009 | McDaniel et al. |
| 2010/0065271 A1 | 3/2010 | McCrary et al. |
| 2010/0179077 A1 | 7/2010 | Turakhia et al. |
| 2013/0065800 A1 | 3/2013 | McDaniel et al. |
| 2014/0228258 A1 | 8/2014 | Mahoney et al. |
| 2014/0349896 A1 | 11/2014 | Hagenaars et al. |
| 2015/0068747 A1 | 3/2015 | Hwang et al. |
| 2015/0167424 A1 | 6/2015 | Richards et al. |
| 2016/0137911 A1 | 5/2016 | Sherman et al. |
| 2016/0326300 A1 | 11/2016 | Gelves et al. |
| 2018/0086894 A1 | 3/2018 | Roy et al. |
| 2018/0086972 A1* | 3/2018 | Chopade ............... C09K 8/665 |
| 2018/0119005 A1* | 5/2018 | Drake ................... E21B 37/00 |
| 2018/0201828 A1 | 7/2018 | Pravesh et al. |

FOREIGN PATENT DOCUMENTS

| | | |
|---|---|---|
| WO | 2004092254 A8 | 5/2006 |
| WO | 2012015860 A1 | 2/2012 |
| WO | 2017053258 A1 | 3/2017 |

OTHER PUBLICATIONS

Konczol et al., "Ultimate Properties of Epoxy Resins Modified with a Polysiloxane-Polycaprolactone Block Copolymer", Journal of Applied Polymer Science, Nov. 7, 1994, pp. 815-826, vol. 54, No. 6.

* cited by examiner

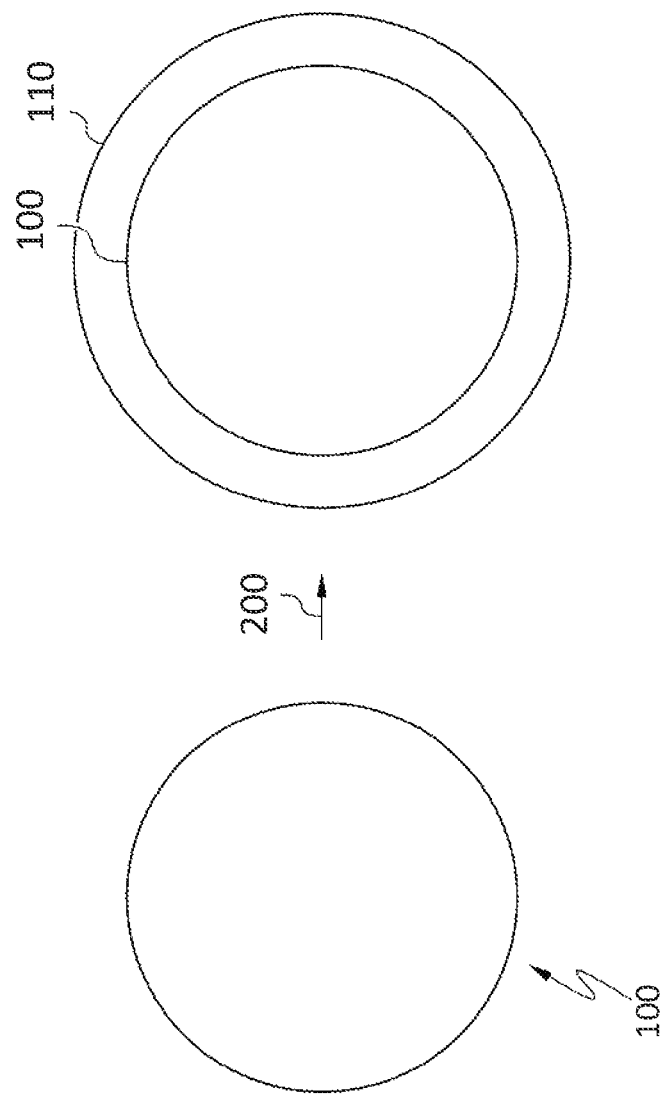

COATED PROPPANTS AND METHODS OF MAKING AND USE THEREOF

CROSS REFERENCE TO RELATED APPLICATION

This application claims priority to U.S. Non-Provisional application Ser. No. 16/830,989 filed on Mar. 26, 2020 and U.S. Provisional Application Ser. No. 62/831,886 filed on Apr. 10, 2019, the entire disclosure of which is hereby incorporated by reference.

TECHNICAL FIELD

Embodiments of the present disclosure generally relate to coated proppants and their method of use.

BACKGROUND

Hydraulic fracturing is a stimulation treatment routinely performed on oil and gas wells. Hydraulic fracturing fluids are pumped into the subsurface formation to be treated, causing fractures to open in the subsurface formation. Proppants, such as grains of sand of a particular size, may be mixed with the treatment fluid to keep the fracture open when the treatment is complete.

SUMMARY

It is often desirable during and after fracturing a subsurface formation to hold the fractures open through the use of proppants for more effective oil and gas production than without. However, conventional uncoated proppants break under downhole stress. In particular, uncoated ceramic proppants break down in wet conditions, which cause them to lose their crush resistance. Temperatures downhole exacerbate this effect.

Proppant coatings are used to protect the proppant particle from degradation by the presence of aqueous fluids at downhole temperatures. The proppant coating increases the surface area of the particle; therefore, the crush stress is distributed over a larger area of the coated proppant particle. In turn, the distribution of force along a larger area should result in a decrease in the amount of crushed proppant particles, also known as 'the crush percentage.' The proppant coating also adheres to the proppant and prevents proppants that are crushed from releasing proppant fines, which may migrate into the formation and restrict flow conductivity of the formation. Conventional proppant coating techniques to reduce both the crush percentage and the generation of proppant fines are done at temperatures greater than 250° C. Conventional proppant coatings are designed to cure completely prior to the use of coated proppants in fracturing operations.

Accordingly, a need exists for coated proppants and their methods of use downhole, and methods of producing such coated proppants that require curing temperatures less than 250° C. As well, the coated proppants should be partially or fully cured prior to use. There is also a continuing need for coated proppants and methods of producing coated proppants that have coatings that are elastic in nature. An elastic coating improves the crush resistance strength of the coated proppants such that the coated proppants may sustain greater closure stress without cracking the proppant particle versus an uncoated proppant particle. This results in a reduced percentage of the proppant materials being crushed. As well, the coating encapsulates and adheres to the proppant material such that at least some of the fines that may be generated when the coated proppant is crushed and trapped within or onto the block copolymer coating; therefore, the amount of "free fines" released is reduced versus an uncoated proppant. The present disclosed subject matter and embodiments thereof address these needs by providing a coated proppant material that includes an encapsulating polymer that comprises a block copolymer. In some embodiments, the encapsulating polymer may be crosslinked. In some specific embodiments, the polymer includes a polystyrene-polyethylenebutylene-polystyrene-grafted-maleic anhydride (PS-PEB-PS-g-MA) co-polymer.

The crosslinked block copolymer proppant coating is a crosslinked block copolymer that is the resultant of a reaction between a block copolymer and a crosslinking agent. In some embodiments, the block copolymer comprises at least two hard segments with a soft segment disposed between the two hard segments. In some embodiments, at least one anhydride group is grafted onto the soft segment. In some embodiments, the block copolymer comprises polystyrene-polyethylenebutylene-polystyrene-grafted-maleic anhydride (PS-PEB-PS-g-MA). In some embodiments, the crosslinking agent is an amine-containing crosslinker. In some embodiments, the amine-containing crosslinker may include 3-(2-aminoethylaminopropyl)trimethoxysilane, 3-aminopropyltriethoxysilane, or combinations thereof.

BRIEF DESCRIPTION OF THE DRAWING

The following detailed description of specific embodiments of the present disclosure can be best understood when read in conjunction with the following drawing, where like structure is indicated with like reference numerals and in which:

FIG. 1 is a schematic view of a proppant particle and a coated proppant, according to one or more embodiments described in this disclosure.

DETAILED DESCRIPTION

As used throughout this disclosure, the term "block copolymer" refers to a polymer having at least two compositionally distinct subunits (A and B) derived from different monomer species. The at least two compositionally distinct subunits are covalently bonded to one another and linearly oriented.

As used throughout this disclosure, the term "polymer backbone" or "copolymer backbone," which may also be called "the main chain," is the linearly-oriented polymeric chain to which all side chains or moieties are attached or grafted to.

As used throughout this disclosure, the term "grafting" refers to a reaction in which one or more compositions are connected to the main chain or polymer backbone as a side chain, in which the grafted composition is compositionally different than the polymer backbone.

As used throughout this disclosure, the term "crosslinking" refers to the covalent bonding of a first polymeric chain with a second polymeric chain using a crosslinking agent.

As used throughout this disclosure, the terms "soft segment" and "hard segment" refer to relative block portions (or blocks) of the polymer chain. The soft segment is the block portion of the polymer chain that if it was in a pure homopolymer form would have a reduced glass transition temperature and would have lesser rigidity relative to that of a similar pure homopolymer form of the block hard segment.

As used throughout this disclosure, the term "hierarchical roughness" refers to micro roughness covered with nano roughness.

As used throughout this disclosure, the term "hydraulic fracturing" refers to a stimulation treatment performed on reservoirs with a permeability of less than 10 milliDarcys. Hydraulic fracturing fluids are pumped into a subsurface formation such that fractures form. The wings of the fracture extend away from the wellbore in opposing directions according to the natural stresses within the subsurface formation. Proppants are mixed with the treatment fluid to keep the fracture open when the treatment is completed. Hydraulic fracturing creates fluid communication with a subsurface formation and bypasses damage that may exist in the near-wellbore area.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppants" refers to particles capable to hold fractures open after a hydraulic fracturing treatment is completed.

As used throughout this disclosure, the term "reservoir" refers to a subsurface formation having sufficient porosity and permeability to store and transmit fluids.

As used throughout this disclosure, the term "wellbore" refers to the drilled hole or borehole, including the openhole or uncased portion of the well. Borehole may refer to the void space defined by the wellbore wall, where the rock face that bounds the drilled hole defines the borehole.

Production wells are a fluid conduit that enable hydrocarbons to travel from the subsurface formation to the surface. As hydrocarbons are produced, the pressure in the formation decreases as the amount of gas in the formation decreases. If the pressure in the formation decreases to less than the dew point of the hydrocarbon gas, then a hydrocarbon liquid condensate forms. This liquid condensate may create a fluid blockage in the formation and limit fluid access between the formation and the wellbore.

The present disclosure is directed to compositions, methods of production, and methods of using a block copolymer encapsulated proppant. In some embodiments, the proppant comprises a proppant particle comprising sand, ceramic material, or combinations thereof. The proppant coating encapsulating the proppant particle may include a block copolymer composition and having a copolymer backbone, where each copolymer backbone further comprises at least two hard segment blocks, and a soft segment block disposed between the two hard segment blocks. In some embodiments, the copolymer backbone is further grafted with an anhydride on the soft segment block. In some embodiments, the grafted anhydride is maleic anhydride. Furthermore, in some embodiments, the anhydride may be crosslinked by an amine-based crosslinker. In some embodiments, the amine-containing crosslinker may include 3-(2-aminoethylaminopropyl)trimethoxysilane, 3-aminopropyltriethoxysilane, or combinations thereof. The block copolymer proppant coating may be of uniform thickness or may comprise changes in thickness throughout, leading to hierarchical roughness in the block copolymer proppant coating.

The non-crosslinked block copolymer may function as a thermoplastic elastomer, improving the elasticity of the block copolymer proppant coating. In embodiments, the crosslinked block copolymer may function as a thermoset elastomer. In embodiments, the crosslinked block copolymer may include thermoreversible crosslinking.

In embodiments where block copolymer is not crosslinked, the block copolymer composition may melt at a specific temperature range, known as the melting temperature, resulting in a flowable medium. The block copolymer composition may resolidify upon cooling to less than the melting temperature.

In embodiments where the crosslinked block copolymer includes thermoreversible crosslinking, the crosslinks may reverse at the melting temperature, resulting in a flowable medium. The crosslinks may reform upon cooling to less than the melting temperature, such that the block copolymer composition may resolidify upon cooling to less than the melting temperature, and is once again crosslinked.

This cyclic process may be repeated an unlimited number of times, meaning that the block copolymer proppant coating may serve as a solid proppant coating at temperatures less than the melting temperature. Furthermore, this means the block copolymer proppant coating may melt when temperature increases to at or greater than the melting temperature, and may return to a solid block copolymer proppant coating when the temperature decreases to less than the melting temperature. This behavior differs from the behavior of conventional thermoset rubbers. Conventional thermoset rubbers are single phase materials with non-reversible chemical bonds which cannot be molten or melt-processed.

In embodiments where the crosslinked block copolymer does not include thermoreversible crosslinking and functions as a thermoset elastomer, the crosslinked block copolymer may demonstrate rubbery elasticity, but may not deform due to the matrix structure of the crosslinked block copolymer. Furthermore, the crosslinked block copolymer may not melt at temperatures of at least 100° C., of at least 150° C., of at least 200° C., of at least 250° C., of at least 300° C., of at least 350° C., or of at least 400° C. Without being bound by theory, the crosslinked block copolymer may not dissolve if exposed to hydrocarbons or aqueous-based solutions. Rather, the crosslinked block copolymer may swell by from 0.5 to 6 weight percent (wt. %), from 0.5 to 5 wt. %, from 0.5 to 4.5 wt. %, from 0.5 to 4 wt. %, from 0.5 to 3.5 wt. %, from 0.5 to 3 wt. %, from 0.5 to 2.5 wt. %, from 2 to 6 wt. %, from 2 to 5 wt. %, from 2 to 4.5 wt. %, from 2 to 4 wt. %, from 2 to 3.5 wt. %, from 2 to 3 wt. %, from 2 to 2.5 wt. %, from 2.5 to 6 wt. %, from 2.5 to 5 wt. %, from 2.5 to 4.5 wt. %, from 2.5 to 3 wt. %, from 3 to 6 wt. %, from 3 to 5 wt. %, from 3 to 4.5 wt. %, from 3 to 4 wt. %, from 3 to 3.5 wt. %, from 3.5 to 6 wt. %, from 3.5 to 5 wt. %, from 3.5 to 4.5 wt. %, from 3.5 to 4 wt. %, from 4 to 6 wt. %, from 4 to 5 wt. %, from 4 to 4.5 wt. %, from 4 to 6 wt. %, from 4.5 to 5 wt. %, or from 5 to 6 wt. % if exposed to hydrocarbons.

The block copolymer functions as a thermoplastic elastomer because the hard segments and the soft segments have different glass transition temperatures. As used in the present application, "segments" and "blocks" are used interchangeably. Glass transition is the gradual and reversible transition in amorphous materials (or in amorphous regions within semicrystalline materials), from a hard and relatively brittle "glassy" state into a viscous or rubbery state as temperature is increased. The glass-transition temperature, $T_g$, of a material characterizes the range of temperatures over which this glass transition occurs. The glass-transition temperature of a homopolymer material (that is, consisting of identical monomer units) is less than the melting temperature, $T_m$, of the crystalline state of the homopolymer material.

The soft segment has a glass transition temperature less than the glass transition temperature of the hard segments. In many cases, the soft segment has a $T_g$ of less than 20° C., and the hard segments have a $T_g$ of at least 80° C., of at least 90° C., of at least 100° C., of at least 150° C., of at least 200° C., of at least 250° C., of at least 300° C., of at least 350° C., or of at least 400° C.

The hard segments may have a $T_g$ of from 80° C. to 400° C., from 80° C. to 350° C., from 80° C. to 300° C., from 80° C. to 250° C., from 80° C. to 200° C., from 80° C. to 150° C., from 80° C. to 100° C., from 80° C. to 90° C., from 90° C. to 400° C., from 90° C. to 350° C., from 90° C. to 300° C., from 90° C. to 250° C., from 90° C. to 200° C., from 90° C. to 150° C., from 90° C. to 100° C., from 100° C. to 400° C., from 100° C. to 350° C., from 100° C. to 300° C., from 100° C. to 250° C., from 100° C. to 200° C., from 100° C. to 150° C., from 150° C. to 400° C., from 150° C. to 350° C., from 150° C. to 300° C., from 150° C. to 250° C., from 150° C. to 200° C., from 200° C. to 400° C., from 200° C. to 350° C., from 200° C. to 300° C., from 200° C. to 250° C., from 250° C. to 400° C., from 250° C. to 350° C., from 250° C. to 300° C., from 300° C. to 400° C., from 300° C. to 350° C., or from 350° C. to 400° C.

Furthermore, the hard segments may comprise at least one aromatic moiety. Specifically, the hard segments may comprise the polymerized product of at least one monomer selected from styrene, alpha-methyl styrene, methacrylate, polyamide, and polyamine.

As used in the present application, the block copolymer is a polymer having at least two compositionally distinct subunits (A and B) derived from different monomer species. In one or more embodiments, these segments may comprise oligomers or homopolymers. In another embodiment, a block copolymer may have at least three different subunits, A, B, and C in the block copolymer backbone. As used in the present application, "segments" and "blocks" may occasionally be used interchangeably as "sub-units", but not in most instances. For example, a block copolymer may have an A-B-A structure, which means there are only two compositionally distinct sub-units A and B; however, there are three segments of the polymer backbone with two of the three segments (i.e., the A segments) having the same composition. As noted previously, in some embodiments, the block copolymer composition comprises at least one anhydride group grafted onto the block copolymer backbone. In further embodiments, these anhydrides may be crosslinked by an amine-containing crosslinker.

The block copolymer composition includes at least one copolymer backbone. Each copolymer backbone comprises at least two hard segments and a soft segment. The hard segments may be the end blocks of the block copolymer. Alternatively, the copolymer backbone may comprise more than one soft segment, and these soft segments may be the end blocks of the block copolymer. In some embodiments, the block copolymer has at least two hard segments and at least one soft segment, where one of the at least one soft segments is disposed between two of the at least two hard segments. In some embodiments, the two hard segments are disposed as the end blocks of the block copolymer. In some embodiments, there are more than one soft segments between the two hard segments disposed as the end blocks of the block copolymer. In some embodiments, only one of the two hard segments are disposed as the end block of the block copolymer. In some embodiments, none of the hard segments are disposed as the end blocks of the block copolymer backbone. In some such embodiments, two soft segments are disposed as the end blocks of the block copolymer.

As stated previously, each copolymer backbone comprises at least two hard segments and a soft segment. The soft segment is disposed between the at least two hard segments. The soft segment may be aliphatic. In some embodiments, the soft segment comprises the polymerized product of one or more monomers selected from butene, butadiene, ethylene, tetrahydrofuran, ethylene oxide, propylene oxide, and acrylic acid. The soft segment may be unsaturated. The soft segment may have a glass transition temperature of from –100° C. to –50° C., from –100° C. to –55° C., from –100° C. to –60° C., from –100° C. to –65° C., from –100° C. to –70° C., from –100° C. to –75° C., from –100° C. to –80° C., from –100° C. to –85° C., from –100° C. to –90° C., from –100° C. to –95° C., from –95° C. to –80° C., from –95° C. to –85° C., from –95° C. to –90° C., from –90° C. to –80° C., from –90° C. to –85° C., from –80° C. to –50° C., from –80° C. to –55° C., from –80° C. to –60° C., from –80° C. to –65° C., from –80° C. to –70° C., from –80° C. to –75° C., from –75° C. to –50° C., from –75° C. to –55° C., from –75° C. to –60° C., from –75° C. to –65° C., from –75° C. to –70° C., from –70° C. to –50° C., from –70° C. to –55° C., from –70° C. to –60° C., from –70° C. to –65° C., from –65° C. to –50° C., from –65° C. to –55° C., from –65° C. to –60° C., from –60° C. to –50° C., from –60° C. to –55° C., from –100° C. to 20° C., from –80° C. to 20° C., from –60° C. to 20° C., from –40° C. to 20° C., from –20° C. to 20° C., from 0° C. to 20° C., from 10° C. to 20° C., from –100° C. to 10° C., from –80° C. to 10° C., from –60° C. to 10° C., from –40° C. to 10° C., from –20° C. to 10° C., from 0° C. to 10° C., from –100° C. to 0° C., from –80° C. to 0° C., from –60° C. to 0° C., from –40° C. to 0° C., from –20° C. to 0° C.,. from –100° C. to –20° C., from –80° C. to –20° C., from –60° C. to –20° C., from –40° C. to –20° C., or from –60° C. to –40° C.

Furthermore, the copolymer backbone has at least one anhydride group grafted onto the soft segment. The anhydride group may be grafted onto one of a secondary carbon or a tertiary carbon of the soft segment. In some embodiments, the anhydride group comprises a succinic anhydride group, a maleic anhydride group, or combinations thereof. Specifically, the block copolymer having at least one anhydride group grafted onto the soft segment may be a SEBS block copolymer and comprise this formula:

Formula 1

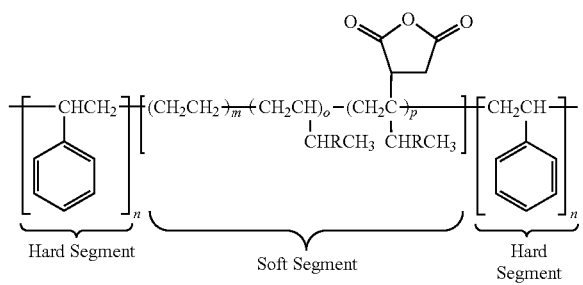

In some embodiments, the block copolymer may comprise styrene-ethylene-butylene-styrene (SEBS) block copolymer, a linear block copolymer including two styrene blocks and an ethylene/butylene block. The SEBS block copolymer may have a polystyrene content of from 10 to 40 wt. %, from 10 to 35 wt. %, from 10 to 30 wt. %, from 10 to 25 wt. %, from 10 to 20 wt. %, from 10 to 15 wt. %, from 13 to 40 wt. %, from 13 to 35 wt. %, from 13 to 30 wt. %, from 13 to 25 wt. %, from 13 to 20 wt. %, from 13 to 15 wt. %, from 15 to 40 wt. %, from 15 to 35 wt. %, from 15 to 30 wt. %, from 15 to 25 wt. %, from 15 to 20 wt. %, from 20 to 40 wt. %, from 20 to 35 wt. %, from 20 to 30 wt. %, from 20 to 25 wt. %, from 25 to 40 wt. %, from 25 to 35 wt. %, from 25 to 30 wt. %, from 30 to 40 wt. %, from 30 to 35 wt. %, from 35 to 40 wt. %, of 30 wt. %, or of 13 wt. %. The SEBS block copolymer may have a specific gravity of from 0.8 to 0.95 g/cc, from 0.8 to 0.9 g/cc, from 0.85 to 0.95 g/cc, from 0.85 to 0.9 g/cc, from 0.9 to 0.95 g/cc, or of 0.91 g/cc. In other embodiments, the block copolymer may comprise polyether block amide (PEBA) block copolymer. PEBA block copolymer is obtained by polycondensation of a carboxylic acid polyamide with an alcohol termination polyether, resulting in $HO-(CO-PA-CO-O-PE-O)_n-H$, where PA is a polyamide and PE is a polyether. PEBA block copolymer is commercially available as VESTAMID, produced by Evonik Corporation.

The block copolymer composition may comprise from 0 to 10 wt. %, from 0 to 5 wt. %, from 0 to 3 wt. %, from 0 to 2 wt. %, from 0 to 1.5 wt. %, from 0 to 1 wt. %, from 0 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % anhydride group. The block copolymer composition may comprise from 1.4 to 2 wt. % anhydride group.

Lastly, the copolymer backbone may be crosslinked. A crosslinker is a substance or agent that induces the subsurface formation of crosslinks. Mixing a block copolymer with a crosslinker results in a chemical reaction that crosslinks the block copolymer. A crosslinked block copolymer proppant coating may retain its shape without dissolving in the hydraulic fracturing fluid, while maintaining a sufficient attraction or bond to the proppant particle. The degree of crosslinking may be controlled by the molar or weight ratio of crosslinker to monomer. Without intending to be bound by theory, crosslinking prevents the block copolymer from melting and increases the elasticity of the block copolymer. The degree of crosslinking directly affects the elasticity of the block copolymer proppant coating. The degree of crosslinking, reflected by the swelling values, can be controlled by the amount of the crosslinker added and the crosslinking duration and temperature. In some embodiments, the crosslinker may comprise at least one of hexamethylenetetramine, paraformaldehyde, oxazolidines, melamine resins, aldehyde donors, resole polymers, and aminosilane crosslinkers.

In some embodiments, the crosslinker may be an amine-containing crosslinker. The amine-containing crosslinker may be an aminosilane crosslinker. The aminosilane may comprise at least one of 3-(2-aminoethylaminopropyl) trimethoxysilane and 3-aminopropyltriethoxysilane. The block copolymer composition may comprise from 0 to 5 wt. %, from 0 to 3 wt. %, from 0 to 2 wt. %, from 0 to 1.5 wt. %, from 0 to 1 wt. %, from 0 to 0.5 wt. %, from 0.5 to 5 wt. %, from 0.5 to 3 wt. %, from 0.5 to 2 wt. %, from 0.5 to 1.5 wt. %, from 0.5 to 1 wt. %, from 1 to 5 wt. %, from 1 to 3 wt. %, from 1 to 2 wt. %, from 1 to 1.5 wt. %, from 1.5 to 5 wt. %, from 1.5 to 3 wt. %, from 1.5 to 2 wt. %, from 2 to 5 wt. %, from 2 to 3 wt. %, or from 3 to 5 wt. % aminosilane. The block copolymer composition may comprise 1 wt. %, 1.3 wt. %, or 1.4 wt. % aminosilane.

The block copolymer proppant coating may be insoluble in hydrocarbon-based fluids, such as, but not limited to, crude oil, oil-based drilling fluids, produced hydrocarbons, diesel, xylenes, and aromatic hydrocarbons.

The block copolymer proppant coating may have a melting temperature of from 150° C. to 250° C., from 150° C. to 240° C., from 150° C. to 230° C., from 150° C. to 220° C., from 150° C. to 210° C., from 170° C. to 250° C., from 170° C. to 240° C., from 170° C. to 230° C., from 170° C. to 220° C., from 170° C. to 210° C., from 180° C. to 250° C., from 180° C. to 240° C., from 180° C. to 230° C., from 180° C. to 220° C., from 180° C. to 210° C., from 190° C. to 250° C., from 190° C. to 240° C., from 190° C. to 230° C., from 190° C. to 220° C., from 190° C. to 210° C., from 200° C. to 250° C., from 200° C. to 240° C., from 200° C. to 230° C., from 200° C. to 220° C., or from 200° C. to 210° C.

The block copolymer proppant coating may have a melt flow index of from 10 to 50 grams per 10 minutes (g/10 min), from 10 to 45 g/10 min, from 10 to 40 g/10 min, from 10 to 35 g/10 min, from 10 to 30 g/10 min, from 10 to 25 g/10 min, from 10 to 20 g/10 min, from 10 to 15 g/10 min, from 15 to 50 g/10 min, from 15 to 45 g/10 min, from 15 to 40 g/10 min, from 15 to 35 g/10 min, from 15 to 30 g/10 min, from 15 to 25 g/10 min, from 15 to 20 g/10 min, from 20 to 50 g/10 min, from 20 to 45 g/10 min, from 20 to 40 g/10 min, from 20 to 35 g/10 min, from 20 to 30 g/10 min, from 20 to 25 g/10 min, from 25 to 50 g/10 min, from 25 to 45 g/10 min, from 25 to 40 g/10 min, from 25 to 35 g/10 min, from 25 to 30 g/10 min, from 30 to 50 g/10 min, from 30 to 45 g/10 min, from 30 to 40 g/10 min, from 30 to 35 g/10 min, from 35 to 50 g/10 min, from 35 to 45 g/10 min, from 35 to 40 g/10 min, from 40 to 50 g/10 min, from 40 to 45 g/10 min, of 40 g/10 min, or of 22 g/10 min, measured at 230° C. by ASTM D1238.

Each coated proppant may comprise from 0.5 to 15 wt. %, from 0.5 to 12 wt. %, from 0.5 to 10 wt. %, from 0.5 to 8 wt. %, from 0.5 to 5 wt. %, from 0.5 to 3 wt. %, from 0.5 to 2 wt. %, from 0.5 to 1 wt. %, from 1 to 15 wt. %, from 1 to 12 wt. %, from 1 to 10 wt. %, from 1 to 8 wt. %, from 1 to 5 wt. %, from 1 to 3 wt. %, from 1 to 2 wt. %, from 2 to 15 wt. %, from 2 to 12 wt. %, from 2 to 10 wt. %, from 2 to 8 wt. %, from 2 to 5 wt. %, from 2 to 3 wt. %, from 3 to 15 wt. %, from 3 to 12 wt. %, from 3 to 10 wt. %, from 3 to 8 wt. %, from 3 to 5 wt. %, from 5 to 15 wt. %, from 5 to 12 wt. %, from 5 to 10 wt. %, from 5 to 8 wt. %, from 8 to 15 wt. %, from 8 to 12 wt. %, from 8 to 10 wt. %, from 10 to 15 wt. %, from 10 to 12 wt. %, or from 12 to 15 wt. % block copolymer proppant coating as calculated by a weight of the proppant particles.

FIG. 1 schematically portrays two states of a proppant particle 100. On the left, a proppant particle 100 is depicted in a first, uncoated state. Then, on the right, a coated proppant is depicted in which the proppant particle 100 is in a second, coated state. In the second state, the proppant particle 100 has undergone a coating step 200 to be coated with a block copolymer proppant coating 110, forming a coated proppant.

The proppant particle may be chosen from any material suitable for use in hydraulic fracturing applications. As previously described, proppants are propping agent particles used in hydraulic fracturing fluids to maintain and hold open subsurface fractures during or following subsurface treatment. In some embodiments, the proppant particle may comprise particles of materials such as oxides, silicates, sand, ceramic, resin, epoxy, plastic, mineral, glass, or combinations thereof. For instance, the proppant particle may comprise graded sand, treated sand, ceramic proppant, plastic proppant, or other materials. The proppant particle may comprise particles of bauxite, sintered bauxite, Ti$^{4+}$/polymer composites, where the superscript "4+" stands for the oxidation state of titanium, titanium nitride (TiN), or titanium carbide. The proppant particle may comprise glass particles or glass beads. Embodiments of the present disclosure may utilize at least one proppant particle and in embodiments in which more than one proppant particle is used, the proppant particles may contain a mixture of two or more different materials or three or more different materials.

The material of the proppant particle may be chosen based on the particular application and characteristics desired, such as the depth of the subsurface formation in which the proppant particles will be used, as proppant particles with greater mechanical strength are needed at greater lithostatic pressures. For instance, ceramic proppant materials exhibit greater strength, thermal resistance, and conductivity than sands. Additionally, ceramic proppant materials have more uniform size and shape than sands.

The proppant particle may include various sizes or shapes. In some embodiments, the one or more proppant particles may have sizes from 8 mesh to 200 mesh (diameters from 74 micrometers (μm) to 2.36 millimeters (mm)). In some embodiments, the proppant particles may have sizes from 8 mesh to 16 mesh (diam. 2380 μm to 1180 μm), 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). The sphericity and roundness of the proppant particles may also vary based on the desired application.

In some embodiments, the proppant particles may have a rough surface texture that may increase adhesion of the block copolymer proppant coating to the proppant particle. The surfaces of the proppant particles may be roughened to increase the surface area of the proppant particle by any suitable physical or chemical method, including, for example, using an appropriate etchant. In some embodiments, the proppant particle may have a surface that provides a desired adhesion of the block copolymer proppant coating to the proppant particle or may already be sufficiently rough without a need for chemical or physical roughening. Specifically, ball milling proppant particles may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, or projections, or other surface defects. The rough surface may have an arithmetic average roughness ($R_a$) of greater than or equal to 1 nanometer (nm) (1 nm=0.001 m). $R_a$ is defined as the arithmetic average of the differences between the local surface heights and the average surface height and can be described by Equation 1, contemplating n measurements:

$$R_a = \frac{1}{n}\sum_{i=1}^{n}|y_i| \quad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle may have an $R_a$ of greater than or equal to 2 nm (0.002 m), or greater than or equal to 10 nm (0.01 m), or greater than or equal to 50 nm (0.05 m), or greater than or equal to 100 nm (0.1 m), or greater than or equal to 1 m.

The block copolymer proppant coating may further comprise a tracer material. Suitable tracer materials may include, but are not limited to, ionic contrast agents such as thorium dioxide (ThO$_2$), barium sulfate (BaSO$_4$), diatrizoate, metrizoate, iothalamate, and ioxaglate; and non-ionic contrast agents such as iopamidol, iohexol, ioxilan, iopromide, iodixanol, and ioversol. Furthermore, the tracer material may be present in a range of from 0.001 to 5.0 wt. %, from 0.001 to 3 wt. %, from 0.001 to 1 wt. %, from 0.001 to 0.5 wt. %, from 0.001 to 0.1 wt. %, from 0.005 wt. %, from 0.005 to 5.0 wt. %, from 0.005 to 3 wt. %, from 0.005 to 1 wt. %, from 0.005 to 0.5 wt. %, from 0.005 to 0.1 wt. %, from 0.01 to 5.0 wt. %, from 0.01 to 3 wt. %, from 0.01 to 1 wt. %, from 0.01 to 0.5 wt. %, from 0.5 to 5.0 wt. %, from 0.5 to 3 wt. %, from 0.5 to 1 wt. %, from 1 to 5.0 wt. %, from 1 to 3 wt. %, or from 3 to 5 wt. % as calculated by a weight of the block copolymer composition.

In some embodiments, the block copolymer proppant coating further includes a lubricating agent to reduce friction on the block copolymer proppant coating. The lubricating agent may include at least one of calcium stearate or silicone oil. The block copolymer proppant coating may comprise from 0.01 to 8 wt. %, from 0.01 to 3.75 wt. %, from 0.01 to 1.75 wt. %, from 0.25 to 8 wt. %, from 0.25 to 3.75 wt. %, from 0.25 to 1.75 wt. %, from 0.75 to 8 wt. %, from 0.75 to 3.75 wt. %, or from 0.75 to 1.75 wt. % lubricating agent as calculated by a weight of the block copolymer composition.

The block copolymer proppant coating may further include an accelerating agent. The accelerating agent may include at least one of hydrochloric acid, lewis acid, boron trifluoride etherate, zinc or manganese ions, acetic acid, carboxylic acid, sodium hydroxide, other bases, or salts, such as zinc acetate. The block copolymer proppant coating may include from 1 to 70 wt. %, from 1 to 45 wt. %, from 1 to 20 wt. %, from 5 to 70 wt. %, from 5 to 45 wt. %, from 5 to 12 wt. %, from 12 to 70 wt. %, from 12 to 45 wt. %, from 12 to 20 wt. % accelerating agent as calculated by a weight of the proppant particles.

The block copolymer proppant coating may further include filler material. The filler material may enhance the mechanical strength of the block copolymer proppant coating and provide resistance to chemicals used in hydraulic fracturing fluid. The filler material may include nano-reinforcing materials in various shapes, such as, but not limited to, spheres, cylinders, cubes, pyramids, cones, triangular prisms, and tetrahedrons. The filler material may include at least one of silica, alumina, mica, graphene, vanadium pentoxide, zinc oxide, calcium carbonate, zirconium oxide, and nano-reinforcing material. The nano-reinforcing material may include at least one of carbon nanotubes, nano silica, nano alumina, nano mica, nanoclay, nano graphene, boron nitride nanotubes, nano vanadium pentoxide, nano zinc oxide, nano calcium carbonate, and nano zirconium oxide.

In some embodiments, the block copolymer proppant coating may be fully cured or may be partially cured. This provides proppant particles of irregular size and shape with greater crush resistance strength and conductivity. Specifically, in certain embodiments, the block copolymer proppant coating may be partially crosslinked before introduction into the wellbore and subsurface formation, and fully crosslinked after introduction into the wellbore and subsurface formation as the downhole temperature completes the crosslinking. By completing the crosslinking of the block copolymer proppant coating in the wellbore and subsurface formation, the block copolymer proppant coating of various coated proppants may crosslink together and form a crosslinked multi-layer proppant bridge within a fracture. This crosslinked multi-layer proppant bridge increases the crush resistance strength of the proppants as a whole, increases the width of the propped fracture, and ensures greater fluid conductivity through the fracture than could be achieved by fully cured individual coated proppants.

Referring again to FIG. 1, in one or more embodiments, the proppant particle 100 may be coated with a block copolymer proppant coating 110 during a coating step 200 to produce, form, or result in a coated proppant. In some embodiments, the block copolymer proppant coating 110 may be a surface layer coating the proppant particle 100. Such a surface layer may cover at least a portion of the surface of the proppant particle 100. The block copolymer proppant coating 110 may cover the entire surface of the proppant particle 100 (as shown) or, alternatively, may only partially surround the proppant particle 100 (not shown), leaving at least a portion of surface of the proppant particle 100 uncoated or otherwise exposed. Also not shown, the block copolymer proppant coating 110 may be the outermost coating of the proppant particle 100 with one or more other, intervening, coatings, positioned between the block copolymer proppant coating 110 and the proppant particle 100. This means that the block copolymer proppant coating 110 indirectly contacts the proppant particle 100, as opposed to directly contacting the proppant particle 100, as shown.

Crush percentage is the percentage of proppants that will be crushed at a given pressure. A lesser crush percentage is desirable, as less coated proppants are likely to be crushed in downhole conditions, where pressure may be greater than 20 pounds per square inch (psi), 200 psi, 500 psi, 1000 psi, 2000 psi, 3000 psi, 5000 psi, 7000 psi, or 10000 psi. The coated proppants of the present disclosure may have a crush percentage of less than 50%, less than 30%, less than 20%, less than 15%, less than 12%, less than 10%, less than 8%, less than 7%, less than 5%, less than 3%, less than 2%, or of 9.7% at 6000 psi. The coated proppants of the present disclosure may have a crush percentage of less than 70%, less than 50%, less than 40%, less than 35%, less than 30%, less than 25%, less than 20%, less than 15%, less than 10%, or of 24.8% at 8000 psi.

Compressive strength is the resistance of a material to breaking under compression. A material with a greater compressive strength suffers less fracturing at a given pressure as compared to a material with a lesser compressive strength. Greater compressive strength is desirable, as the block copolymer proppant coating is less likely to fracture in downhole conditions, where pressure may be greater than 20 psi, 200 psi, 500 psi, 1000 psi, 2000 psi, 3000 psi, 5000 psi, 7000 psi, or 10000 psi. The block copolymer proppant coating of the present disclosure may have a compressive strength of from 3500 to 6000 psi, from 3500 to 5500 psi, from 3500 to 5200 psi, from 3500 to 5000 psi, from 3500 to 4700 psi, from 3500 to 4500 psi, from 3500 to 4100 psi, from 4000 to 6000 psi, from 4000 to 5500 psi, from 4000 to 5200 psi, from 4000 to 5000 psi, from 4000 to 4700 psi, from 4000 to 4500 psi, from 4500 to 6000 psi, from 4500 to 5500 psi, from 4500 to 5200 psi, from 4500 to 5000 psi, from 4500 to 4700 psi, from 4700 to 6000 psi, from 4700 to 5500 psi, from 4700 to 5200 psi, from 4700 to 5000 psi, from 5000 to 6000 psi, from 5000 to 5500 psi, from 5000 to 5200 psi, or from 4000 to 5200 psi, meaning that the block copolymer proppant coating will not fracture until its compressive strength has been exceeded.

Tensile strength is the resistance of a material to breaking under tension. A material with a greater tensile strength suffers less fracturing at a given tension as compared to a material with a lesser tensile strength. The block copolymer proppant coating of the present disclosure may have a tensile strength of from 1000 to 5000 psi, from 1000 to 4500 psi, from 1000 to 4000 psi, from 1000 to 3500 psi, from 1000 to 3000 psi, from 1000 to 2000 psi, from 1000 to 1500 psi, from 2000 to 5000 psi, from 2000 to 4500 psi, from 2000 to 4000 psi, from 2000 to 3500 psi, from 2000 to 3000 psi, from 3000 to 5000 psi, from 3000 to 4500 psi, from 3000 to 4000 psi, from 3000 to 3500 psi, from 3500 to 5000 psi, from 3500 to 4500 psi, from 3500 to 4000 psi, from 4000 to 5000 psi, from 4000 to 4500 psi, or from 4500 to 5000 psi, meaning that block copolymer proppant coating will not fracture until its tensile strength has been exceeded.

An elastic modulus measures a material's resistance to being deformed elastically, or non-permanently, when a stress is applied to it. The elastic modulus of an object is defined as the slope of its stress-strain curve in the elastic deformation region. A stiffer material will have a greater elastic modulus. The equation for an elastic modulus has the generic form:

$$\lambda = \frac{stress}{strain} \qquad \text{EQUATION 2}$$

where stress is the force causing the deformation divided by the area to which the force is applied and strain is the ratio of the change in some parameter caused by the deformation to the original value of the parameter. The block copolymer proppant coating of the present disclosure may have an elastic modulus of from $1.5 \times 10^6$ to $2.5 \times 10^6$ psi, $1.5 \times 10^6$ to $2.0 \times 10^6$ psi, from $1.75 \times 10^6$ to $2.5 \times 10^6$ psi, from $1.75 \times 10^6$ to $2.0 \times 10^6$ psi, from $1.75 \times 10^6$ to $1.95 \times 10^6$ psi, from $1.75 \times 10^6$ to $1.9 \times 10^6$ psi, from $1.75 \times 10^6$ to $1.85 \times 10^6$ psi, from $1.85 \times 10^6$ to $2.5 \times 10^6$ psi, from $1.85 \times 10^6$ to $2.0 \times 10^6$ psi, from $1.85 \times 10^6$ to $1.95 \times 10^6$ psi, from $1.85 \times 10^6$ to $1.9 \times 10^6$ psi, from $1.9 \times 10^6$ to $2.5 \times 10^6$ psi, from $1.9 \times 10^6$ to $2.0 \times 10^6$ psi, or from $1.9 \times 10^6$ to $1.95 \times 10^6$ psi.

Further embodiments of the present disclosure are directed to methods for producing coated proppants. The method may include coating proppant particles with the block copolymer proppant coating to produce coated proppants with block copolymer proppant coating. The block copolymer proppant coating is a block copolymer composition having at least one copolymer backbone. Each copolymer backbone comprises at least two hard segments and a soft segment disposed between the at least two hard segments.

In some embodiments, the method may further include forming the block copolymer proppant coating by adding at least one anhydride group onto the soft segment of at least one copolymer backbone. The anhydride group may be at least one of a succinic anhydride group, and a maleic anhydride group. Furthermore, the anhydride group may be grafted onto one of a secondary carbon or a tertiary carbon of the soft segment.

In one embodiment, the method may further include crosslinking the at least one anhydride group with a crosslinker before coating the proppant particles with the block copolymer proppant coating. In another embodiment, the method may further include crosslinking the at least one anhydride group with a crosslinker after coating the proppant particles with the block copolymer proppant coating. In some embodiments, the crosslinker may comprise at least one of hexamethylenetetramine, paraformaldehyde, oxazolidines, melamine resins, aldehyde donors, resole polymers, and aminosilane crosslinkers. In some embodiments the crosslinker is an amine-containing crosslinker. The amine-containing crosslinker may be an aminosilane crosslinker. The aminosilane may comprise at least one of 3-(2-aminoethylaminopropyl)trimethoxysilane and 3-aminopropyltriethoxysilane. The block copolymer proppant coating may be fully crosslinked prior to introducing the coated proppants into a wellbore. In yet another embodiment, the block copolymer proppant coating may be partially cured and partially crosslinked when the coated proppants are introduced into a wellbore. The block copolymer proppant coating may be partially crosslinked by heating the coated proppants until the block copolymer proppant coating is free of visible liquid crosslinker. The amount of crosslinking may be determined through infrared spectroscopy or through differential scanning calorimetry (DSC) by measuring the enthalpy of the crosslinking reaction. Chemical methods may also be used to determine the density of the crosslinking network through, for example, testing the swellability of the block copolymer proppant coating in various solvents. Furthermore, the amount of crosslinking may be measured through testing the mechanical properties of the block copolymer proppant coating. For example, tensile testing, shore hardness testing, or dynamic mechanic analysis (DMA) may be used to determine the amount of crosslinking.

Coating the proppant particles with block copolymer proppant coating may include coating the proppant particles with from 0.5 to 10 wt. % block copolymer proppant coating as calculated by a weight of the proppant particles. Coating the proppant particles with block copolymer proppant coating may include coating the proppant particles with from 0.5 to 15 wt. %, from 0.5 to 12 wt. %, from 0.5 to 8 wt. %, from 0.5 to 5 wt. %, from 0.5 to 3 wt. %, from 0.5 to 2 wt. %, from 0.5 to 1 wt. %, from 1 to 15 wt. %, from 1 to 12 wt. %, from 1 to 10 wt. %, from 1 to 8 wt. %, from 1 to 5 wt. %, from 1 to 3 wt. %, from 1 to 2 wt. %, from 2 to 15 wt. %, from 2 to 12 wt. %, from 2 to 10 wt. %, from 2 to 8 wt. %, from 2 to 5 wt. %, from 2 to 3 wt. %, from 3 to 15 wt. %, from 3 to 12 wt. %, from 3 to 10 wt. %, from 3 to 8 wt. %, from 3 to 5 wt. %, from 5 to 15 wt. %, from 5 to 12 wt. %, from 5 to 10 wt. %, from 5 to 8 wt. %, from 8 to 15 wt. %, from 8 to 12 wt. %, from 8 to 10 wt. %, from 10 to 15 wt. %, from 10 to 12 wt. %, or from 12 to 15 wt. % block copolymer proppant coating as calculated by a weight of the proppant particles.

The method may further include coating the proppants with a coupling agent. In some embodiments, the method further includes employing a lubricating agent or an accelerating agent. In other embodiments, the method includes coating proppant particles with a top coating. The top coating may be an overlying layer that may be added for additional properties or features. As a non-limiting example, additional coatings may be used in conjunction with, or may comprise, a breaker. As used throughout this disclosure, a "breaker" refers to a compound that may break or degrade the coating after a fracturing operation to prevent subsurface formation damage. In some embodiments, the breaker may be an oxidizer or enzyme breaker. The breaker may be any suitable materials capable of degrading a coating material.

The method may further include heating the proppant particles up to from 100° C. to 210° C., mixing the proppant particles and the block copolymer proppant coating to form a mixture, cooling the mixture, and adding an amine-containing crosslinker to the mixture after cooling. In a method in which the block copolymer composition includes SEBS block copolymer, the method may further include heating the proppant particles up to from 100° C. to 210° C., from 70° C. to 150° C., from 70° C. to 130° C., from 70° C. to 120° C., from 70° C. to 110° C., from 70° C. to 100° C., from 80° C. to 150° C., from 80° C. to 130° C., from 80° C. to 120° C., from 80° C. to 110° C., from 80° C. to 100° C., from 90° C. to 150° C., from 90° C. to 130° C., from 90° C. to 120° C., from 90° C. to 110° C., from 90° C. to 100° C., from 100° C. to 150° C., from 100° C. to 130° C., from 100° C. to 120° C., or from 100° C. to 110° C. In a method in which the block copolymer composition includes PEBA block copolymer, the method may further include heating the proppant particles up to from 100° C. to 210° C., from 150° C. to 300° C., from 150° C. to 230° C., from 150° C. to 210° C., from 150° C. to 200° C., from 150° C. to 180° C., from 170° C. to 300° C., from 170° C. to 230° C., from 170° C. to 210° C., from 170° C. to 200° C., from 170° C. to 180° C., from 180° C. to 300° C., from 180° C. to 230° C., from 180° C. to 210° C., from 180° C. to 200° C., from 200° C. to 300° C., from 200° C. to 230° C., from 200° C. to 210° C., from 210° C. to 300° C., or from 210° C. to 250° C. The heating may include calcining by any suitable process such as by forced hot air heating, convection, friction, conduction, combustion, exothermic reactions, microwave heating, or infrared radiation, for example.

In some embodiments, the method may further comprise roughening the proppant particles before the coating step. The proppant particles may be chemically or physically roughened, as previously described.

In some embodiments, the coating step may include contacting the proppant particle with the mixture in a fluidized bed process. In some embodiments, the coating step may include a stationary, bubbling, circulation, or vibratory fluidized bed process. In some embodiments, the coating step may include spraying or saturating the proppant particles with the mixture. The coating step may include, in some embodiments, tumbling or agitating the coated proppants to prevent agglomeration or clumping. The coating step may include adding another compound to the mixture, such as a solvent, an initiator, an adhesion promoter, or an additive, to form the block copolymer proppant coating. In some embodiments, the coating process may be conducted with an emulsion coating technique. In some embodiments, the adhesion promoter may comprise a silane (for example, aminosilane) or a silane-containing monomer. In some embodiments, an adhesion promoter may not be necessary to coat the proppant particles.

A hydraulic fracturing fluid and a method for increasing a rate of hydrocarbon production from a subsurface formation is also disclosed. A hydraulic fracturing fluid may be used to propagate fractures within a subsurface formation and further open fractures. The hydraulic fracturing fluid may include water, a clay-based component, and the coated proppants disclosed in this disclosure. The clay-based component may include one or more components selected from the group consisting of lime (CaO), $CaCO_3$, bentonite, montmorillonite clay, barium sulfate (barite), hematite ($Fe_2O_3$), mullite ($3Al_2O_3.2SiO_2$ or $2Al_2O_3.SiO_2$), kaolin ($Al_2Si_2O_5(OH)_4$ or kaolinite), alumina ($Al_2O_3$, or aluminum oxide), silicon carbide, tungsten carbide, or combinations thereof. Coated proppants within the hydraulic fracturing fluid may aid in treating subsurface fractures, to prop open and keep open the fracture. The method may include producing a first rate of production of hydrocarbons from the subsurface formation, introducing a hydraulic fracturing fluid comprising the coated proppants into the subsurface formation, and increasing hydrocarbon production from the subsurface formation by producing a second rate of production of hydrocarbons from the subsurface formation, in which the second rate of production of hydrocarbons is greater than the first rate of production of hydrocarbons.

The hydraulic fracturing fluid in the subsurface fracture may comprise coated proppants suspended in the hydraulic fracturing fluid. In some embodiments, the coated proppants may be distributed throughout the hydraulic fracturing fluid. The coated proppants may not aggregate or otherwise coalesce within the subsurface formation, owing in part to the wettability characteristics of the block copolymer proppant coating. The hydraulic fracturing fluid may be pumped into the subsurface formation or may be otherwise contacted with the subsurface formation.

Embodiments of methods of treating a subsurface formation may include propagating at least one subsurface fracture in the subsurface formation to treat the subsurface formation. In some embodiments, the subsurface formation may be a rock or shale subsurface formation. In some embodiments, contacting of the subsurface formation may include drilling into the subsurface formation and subsequently injecting the hydraulic fracturing fluid into at least one subsurface fracture in the subsurface formation. In some embodiments, the hydraulic fracturing fluid may be pressurized before being injected into the subsurface fracture in the subsurface formation.

EXAMPLES

The following examples illustrate features of the present disclosure but are not intended to limit the scope of the disclosure.

In this study two maleic anhydride (MA) grafted SEBS copolymers from Kraton corporation were employed to coat Frac Grade sand, and then crosslinked with 3-aminopropyltriethoxysilane. The SEBS block copolymers are commercially available from Kraton Corporation as Kraton™ FG 1901 and Kraton™ FG 1924, the properties of which are listed in Table 1. These SEBS block copolymers contained polystyrene as the hard segment end blocks, ethylene/butene copolymer as the soft segment, and has been grafted with about 2 wt. % maleic anhydride. The catalytic hydrogenation of maleic anhydride results in succinic anhydride.

TABLE 1

Block Copolymer Properties

| Property | FG 1901 | FG 1924 |
|---|---|---|
| Monomer 1 (wt %) | Ethylene† | Ethylene‡ |
| Monomer 2 (wt %) | Butylene† | Butylene‡ |
| Monomer 3 (wt %) | Styrene (30%) | Styrene (13%) |
| MA (wt %) | 1.4-2.0% | 0.7-1.3% |
| Melt index (g/10 min)* | 22 | 40 |
| Tensile Strength, psi* | 5000 | 3400 |
| % Elongation at break* | 500% | 750% |
| Styrene/rubber (wt. %) | 30/70 | 13/87 |
| Relative Molecular weight (MW) | Low | Medium |
| MW of each styrene segment | 7500 | 13125 |
| MW of rubber segment | 37500 | 202000 |
| Bound succinic Anhydride (wt. %) | 1.4-2.0 | 1 |
| Melt Flow Index (g/10 min) at 230° C. (ASTM D1238) | 22 | 40 |
| % Elongation at Break | 500 | 750 |
| Physical Form | Powder (Dusted with inorganic powder to prevent particle adhesion) | Powder (Dusted with inorganic powder to prevent particle adhesion) |
| Particle size | $D_{50}$-410µ; $D_{10}$-276µ; $D_{90}$-1350µ | $D_{50}$-360µ; $D_{10}$-260µ; $D_{90}$-510µ |
| Solid-Liquid Transition Temperature Range, ° F. | 215 | — |

†Sum of wt % of Monomer 1 and Monomer 2 = 70 wt %
‡Sum of wt % of Monomer 1 and Monomer 2 = 87 wt %
*Measured by ASTM D412.

One batch of 165 grams of Unifrac 20/40 sand was blended with 5 grams (3 wt %) FG 1924. Another batch of Unifrac 20/40 sand was mixed with FG 1901. Both batches were hot rolled in an oven at 220° F. for 18 hrs. The hot rolled batches were sieved through 8 mesh screen, and the weights of the particles that were retained by the screen and that passed through the screen were measured. The separated sand samples were subjected to thermogravimetric analysis (TGA) to estimate the amount of elastomer coating. The results are shown in Table 2.

TABLE 2

| Block Copolymer | Amount of coated sand retained, g (wt %) | Amount of coated sand that passed through sieve, g (wt %) | Amount of coating on retained sand, wt. % | Amount of coating on sand passed through sieve, wt. % |
|---|---|---|---|---|
| FG 1901 | 5.8 (3.5%) | 158 (95.8%) | 28 | 2.5 |
| FG 1924 | 15.8 (9.6%) | 149 (90.3%) | 27 | 0.4 |

The results in Table 2 show that the comparative example including FG 1924 was unevenly coated on the sand. This is shown by the greater amounts of retained sample containing greater amounts of elastomer, and lesser amounts of elastomer on the sample that passed through. Next, 0.2 grams aminopropylaminoethyl trimethoxysilane was added dropwise with shaking to 80 grams of the FG 1901 coated sand comparative example that passed through the 8 mesh screen. This sample was then hot rolled at 200° F. for 4 hrs. Sand coated with crosslinked block copolymer, such as the sand coated with Inventive Example FG 1901+ crosslinker shown in Table 3, have a distinctly different visual appearance reflected of greater transparency and smoother surfaces than the uncoated sand.

All samples of sand, including uncoated control samples, coated but uncrosslinked samples containing the two elastomers, and coated crosslinked samples containing FG 1901 were subjected to crush resistance strength testing under a pressure of 6000 and 8000 psi. The wt % of fines from crushing of sand samples under a pressure was measured by passing the crushed sample through 40 mesh screen. The results are shown in Table 3 and Table 4.

TABLE 3

Results from Crush Studies under a pressure of 6000 psi.

| Sample | Stress (psi) | Proppant Mesh Size/Label | Initial Wt (g) | Final Wt (g) | Percent Crushed (%) |
|---|---|---|---|---|---|
| Control | 6000 | UNIFRAC 20/40 | 34.3523 | 7.3073 | 21.3 |
| Comparative FG 1924 | 6000 | 20/40 FG 1924 (0.4 wt %) | 34.1100 | 5.6489 | 16.6 |
| Comparative FG 1901 | 6000 | FG 1901 (2.5 wt %) | 34.0727 | 6.9774 | 20.5 |
| Inventive FG 1901 + crosslinker | 6000 | 20/40 FG1901 + Aminosilane (3.2 wt %) | 35.9790 | 3.4784 | 9.7 |

TABLE 4

Results from Crush Studies under a pressure of 8000 psi.

| Sample | Stress (psi) | Proppant Mesh Size/Label | Initial Wt (g) | Final Wt (g) | Percent Crushed (%) |
|---|---|---|---|---|---|
| Control | 8000 | UNIFRAC 20/40 | 35.2216 | 11.6206 | 33.0 |
| Comparative FG 1924 | 8000 | 20/40 FG 1924 (0.4 wt %) | 34.2677 | 10.8455 | 31.6 |
| Comparative FG 1901 | 8000 | FG 1901 (2.5 wt %) | 34.911 | 11.7847 | 33.8 |
| Inventive FG 1901 + crosslinker | 8000 | 20/40 FG1901 + Aminosilane (3.2 wt %) | 34.4598 | 8.5451 | 24.8 |

The results clearly show that crosslinking the block copolymer significantly reduces the amounts of fines, indicating that the crosslinked block copolymer can be used to coat proppants, including sands, and produce coated proppants with a crush resistance strength capable of withstanding crush pressures of 6000 psi and 8000 psi.

The coated sand samples were also tested for the possibility that the coating may either dissolve or swell in hydrocarbon solvents while inside the fractures. The coated samples were allowed to soak in xylenes for 4 hrs at room temperature. The excess solvent was poured and the samples were quickly dried with paper towels and the samples were weighed. The results are shown in Table 5.

TABLE 5

| Sample | Dry weight (g) | Soaked sample weight (g) |
|---|---|---|
| Comparative FG 1901 | 8.73 | 8.90 |
| Inventive FG 1901 + crosslinker | 10 | 10.4 |

The results show that the block copolymer proppant coating does not dissolve (or swell greater than 10%) in xylene.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification modifications and variations come within the scope of the appended claims and their equivalents. Unless otherwise stated within the application, all tests, properties, and experiments are conducted at room temperature and atmospheric pressure.

The presently described subject matter may include one or more aspects, which should not be regarded as limiting on the teachings of the present disclosure. A first aspect may include a method for producing coated proppants with a block copolymer proppant coating, the method comprising: coating proppant particles with the block copolymer proppant coating to produce coated proppants with block copolymer proppant coating, in which the block copolymer proppant coating is a block copolymer composition having at least one copolymer backbone, each copolymer backbone comprising at least two hard segments, and a soft segment disposed between the at least two hard segments.

A second aspect includes a coated proppant comprising: a proppant particle comprising sand, ceramic material, or combinations thereof; and a block copolymer proppant coating the proppant particle, in which the block copolymer proppant coating is a block copolymer composition having at least one copolymer backbone, each copolymer backbone comprising at least two hard segments, and a soft segment disposed between the at least two hard segments, wherein the copolymer backbone has at least one anhydride group grafted onto the soft segment, and the anhydride group being crosslinked by an amine-containing crosslinker.

A third aspect includes a method for increasing a rate of hydrocarbon production from a subsurface formation comprising: producing a first rate of production of hydrocarbons from the subsurface formation; introducing a hydraulic fracturing fluid comprising a plurality of coated proppants into the subsurface formation; and increasing hydrocarbon production from the subsurface formation by producing a second rate of production of hydrocarbons from the subsurface formation, in which the second rate of production of hydrocarbons is greater than the first rate of production of hydrocarbons Another aspect includes any of the previous aspects, further comprising forming the block copolymer proppant coating by adding at least one anhydride group onto the soft segment of at least one copolymer backbone.

Another aspect includes any of the previous aspects, in which the anhydride group comprises a succinic anhydride group, a maleic anhydride group, or combinations thereof.

Another aspect includes any of the previous aspects, in which the anhydride group is grafted onto one of a secondary carbon or a tertiary carbon of the soft segment.

Another aspect includes any of the previous aspects, further comprising crosslinking the anhydride group with an amine-containing crosslinker before coating the proppant particles with the block copolymer proppant coating.

Another aspect includes any of the previous aspects, further comprising crosslinking the anhydride group with an amine-containing crosslinker after coating the proppant particles with the block copolymer proppant coating.

Another aspect includes any of the previous aspects, in which the amine-containing crosslinker comprises 3-(2-aminoethylaminopropyl)trimethoxysilane, 3-aminopropyltriethoxysilane, or combinations thereof.

Another aspect includes any of the previous aspects, further comprising heating the proppant particles up to from 100° C. to 210° C., mixing the proppant particles and the block copolymer proppant coating to form a mixture, cooling the mixture, and adding an amine-containing crosslinker to the mixture after cooling.

Another aspect includes any of the previous aspects, in which coating the proppant particles with block copolymer proppant coating comprises coating the proppant particles with from 1 to 10 wt. % block copolymer proppant coating as calculated by a weight of the proppant particles.

Another aspect includes any of the previous aspects, in which the hard segments comprise at least one aromatic moiety.

Another aspect includes any of the previous aspects, in which the hard segments comprise the polymerized product of at least one monomer selected from styrene, alpha-methyl styrene, methacrylate, polyamide, and polyamine.

Another aspect includes any of the previous aspects, in which the hard segments are end blocks.

Another aspect includes any of the previous aspects, in which the soft segment is aliphatic.

Another aspect includes any of the previous aspects, in which the soft segments comprise the polymerized product of one or more monomers selected from butene, butadiene, ethylene, tetrahydrofuran, ethylene oxide, propylene oxide, and acrylic acid.

Another aspect includes any of the previous aspects, in which the soft segment is unsaturated.

Another aspect includes any of the previous aspects, in which the block copolymer having the grafted anhydride group comprises the formula

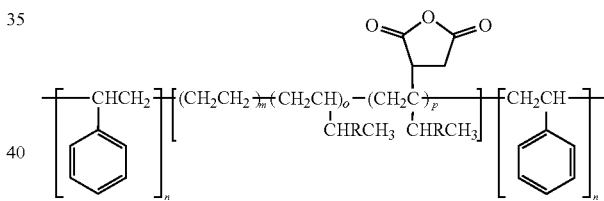

Another aspect includes any of the previous aspects, in which the block copolymer comprises styrene-ethylene-butylene-styrene (SEBS) block copolymer.

Another aspect includes any of the previous aspects, in which the block copolymer comprises polyether block amide (PEBA) block copolymer.

Another aspect includes any of the previous aspects, in which the block copolymer has an A-B-A structure, in which A and B are two compositionally distinct sub-units.

Another aspect includes any of the previous aspects, in which the block copolymer proppant coating has a tensile strength of from 3000 to 5000 psi.

Another aspect includes any of the previous aspects, in which the block copolymer proppant coating further comprises a tracer material including thorium dioxide ($ThO_2$), barium sulfate ($BaSO_4$), diatrizoate, metrizoate, iothalamate, ioxaglate, iopamidol, iohexol, ioxilan, iopromide, iodixanol, ioversol, or combinations thereof.

Another aspect includes any of the previous aspects, in which the coated proppant has a crush percentage of less than 10% at 6000 psi.

Another aspect includes any of the previous aspects, in which the coated proppant has a crush percentage of less than 25% at 8000 psi.

Another aspect includes any of the previous aspects, in which the block copolymer proppant coating further comprises a tracer material comprising at least one of thorium dioxide (ThO$_2$), barium sulfate (BaSO$_4$), diatrizoate, metrizoate, iothalamate, ioxaglate, iopamidol, iohexol, ioxilan, iopromide, iodixanol, and ioversol.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method for producing coated proppants with a block copolymer proppant coating, the method comprising:
   coating proppant particles with the block copolymer proppant coating to produce coated proppants with block copolymer proppant coating, in which the block copolymer proppant coating is a block copolymer composition having at least one copolymer backbone, each copolymer backbone comprising at least two hard segments, and a soft segment disposed between the at least two hard segments; and
   forming the block copolymer proppant coating by adding at least one anhydride group onto the soft segment of at least one copolymer backbone.

2. The method of claim 1, in which the anhydride group comprises a succinic anhydride group, a maleic anhydride group, or combinations thereof.

3. The method of claim 1, in which the anhydride group is grafted onto one of a secondary carbon or a tertiary carbon of the soft segment.

4. The method of claim 1, in which the block copolymer having the grafted anhydride group comprises styrene-ethylene-butylene-styrene (SEBS) block copolymer in which the anhydride group comprises a succinic anhydride group and the anhydride group is grafted onto one of a secondary carbon or a tertiary carbon of the soft segment.

5. The method of claim 1, further comprising crosslinking the anhydride group with an amine-containing crosslinker after coating the proppant particles with the block copolymer proppant coating, in which the amine-containing crosslinker comprises 3-(2-aminoethylaminopropyl)trimethoxysilane, 3-aminopropyltriethoxysilane, or combinations thereof.

6. The method of claim 1, further comprising heating the proppant particles up to from 100° C. to 210° C., mixing the proppant particles and the block copolymer proppant coating to form a mixture, cooling the mixture, and adding an amine-containing crosslinker to the mixture after cooling.

7. The method of claim 1, in which coating the proppant particles with block copolymer proppant coating comprises coating the proppant particles with from 1 to 10 wt. % block copolymer proppant coating as calculated by a weight of the proppant particles.

8. The method of claim 1, in which the hard segments comprise at least one aromatic moiety and the soft segment is unsaturated.

9. The method of claim 1, in which:
   the hard segments comprise the polymerized product of at least one monomer selected from styrene, alpha-methyl styrene, methacrylate, polyamide, and polyamine; and
   the soft segments comprise the polymerized product of one of more monomers selected from butene, butadiene, ethylene, tetrahydrofuran, ethylene oxide, propylene oxide, and acrylic acid.

10. The method of claim 1, in which the hard segments are end blocks and the soft segment is aliphatic.

11. The method of claim 1, in which the block copolymer having the grafted anhydride group comprises styrene-ethylene-butylene-styrene (SEBS) block copolymer in which the anhydride group comprises a succinic anhydride group and the anhydride group is grafted onto one of a secondary carbon or a tertiary carbon of the soft segment

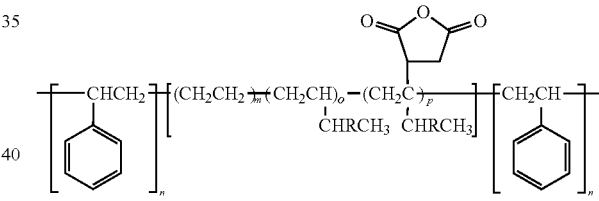

12. The method of claim 1, in which the block copolymer comprises styrene-ethylene-butylene-styrene (SEBS) block copolymer, polyether block amide (PEBA) block copolymer, or both.

13. The method of claim 1, in which the block copolymer has an A-B-A structure, in which A and B are two compositionally distinct sub-units.

* * * * *